United States Patent
Wang et al.

(10) Patent No.: US 8,865,118 B2
(45) Date of Patent: Oct. 21, 2014

(54) CONTINUOUS HYDROGEN PRODUCTION DEVICE AND METHOD THEREOF

(75) Inventors: Hong-Wen Wang, Tao-Yuan (TW); Hsin-Te Teng, Tao-Yuan (TW)

(73) Assignee: Chung Yuan Christian University, Tao-Yuan (TW)

(*) Notice: Subject to any disclaimer, the term of this patent is extended or adjusted under 35 U.S.C. 154(b) by 248 days.

(21) Appl. No.: 13/343,836

(22) Filed: Jan. 5, 2012

(65) Prior Publication Data

US 2013/0149234 A1    Jun. 13, 2013

(30) Foreign Application Priority Data

Dec. 8, 2011   (TW) .............................. 100145247 A

(51) Int. Cl.
    *C01B 3/08*    (2006.01)
(52) U.S. Cl.
    USPC ........................................................ 423/657
(58) Field of Classification Search
    USPC ........................................................ 423/657
    See application file for complete search history.

(56) References Cited

U.S. PATENT DOCUMENTS

| 7,883,805 | B2 * | 2/2011 | Nakai et al. ................... 429/416 |
| 8,080,233 | B2 * | 12/2011 | Woodall et al. ............... 423/657 |
| 8,418,435 | B2 * | 4/2013 | Hatoum ......................... 60/217 |
| 8,529,867 | B2 * | 9/2013 | Fullerton ....................... 423/657 |

FOREIGN PATENT DOCUMENTS

| CN | 101284646 | * | 10/2008 |
| RU | 2350563 | * | 3/2009 |
| WO | WO 2004/071950 A1 | * | 8/2004 |

OTHER PUBLICATIONS

Vlaskin, M.S. et al, "Oxidation kinetics of micron-sized aluminum powder in high-temperature boiling water", International Journal of Hydrogen Energy (2011), 36 (11), 6484-6495.*

* cited by examiner

*Primary Examiner* — Wayne Langel
(74) *Attorney, Agent, or Firm* — WPAT, PC; Justin King

(57) ABSTRACT

The present invention provides a continuous hydrogen production device and method thereof. The device comprises a reaction chamber, a solid raw material inlet, a liquid raw material inlet, a gas outlet, and a temperature controller. The reaction chamber contains an initiation solution, comprising a saturated aluminum hydroxide solution. The solid raw material inlet is used to add aluminum powders into the reaction chamber and the liquid raw material inlet is used to add water into the reaction chamber. The gas outlet is used to collect the produced hydrogen gas. The temperature controller is used to control the temperature of the reaction chamber within a preset reaction temperature range.

5 Claims, 2 Drawing Sheets

CONTINUOUS HYDROGEN PRODUCTION DEVICE AND METHOD THEREOF

BACKGROUND OF THE INVENTION

1. Field of the Invention

The present invention is generally related to a hydrogen production device, and more particularly to a continuous hydrogen production device and method thereof.

2. Description of the Prior Art

At present, hydrogen gas is considered an excellent fuel for producing clean energy because of light weight, high energy density and having no pollution. The method of hydrogen production by water spilt reaction, especially reaction of aluminum with water to produce hydrogen, has been researched and also described in various patents and reports. Although the approaches using water spilt reaction have not been proven commercially viable yet, they are still under active development, especially for clean energy application.

Since pure aluminum metal reacts with oxygen in air to generate an aluminum oxide film, the aluminum oxide film covers the surface of aluminum metal while exposed in air and prevents aluminum metal from further oxidization. Therefore, generally hydrogen production by reaction of aluminum with water to be actively taken place requires firstly breaking or destroying the aluminum oxide film on the surface of aluminum metal. The hydrogen production method by reaction of aluminum with water can use various promoters to promote hydrogen production. Such a promoter, for example, can be hydroxides, oxides, salts, or combination of oxides and salts, etc. Or, aluminum metal can be modified to promote hydrogen production. For example, alkali metals or alkaline earth metals can form an alloy with aluminum metal to be used in the water spilt reaction instead of aluminum metal.

U.S. Pat. No. 6,582,676 (by A. Chaklader) discloses a method of producing hydrogen by reacting a metal (Al, Mg, Si, or Zn) with water in the presence of a ceramic catalyst. The ceramic catalyst usually is an oxide, preferably aluminum oxide or carbon. However, the additive has functionality only if the additive is in contact with aluminum and the additive and aluminum should be blended thoroughly to react with each other.

In conclusion, the method using strong base such as sodium hydroxide, potassium hydroxide, etc., to break or destroy the aluminum oxide film on the surface of aluminum metal, referring to U.S. Pat. Nos. 4,308,248 and 6,506,306, comprises using a reaction solution with alkaline and thus needs a special reaction container to prevent from being damaged by the reaction solution. On the other hand, the method of using modified aluminum, that is, aluminum alloy, has higher production cost and has more difficulty in metal recovery because other metals are used. Moreover, the cost of the recovery process having several different kinds of metals is also higher. Therefore, since energy acquirement should still satisfy clean and low cost requirements, it is important to have a novel hydrogen production device and method to achieve the purposes of having a high reaction rate and acquiring low-cost clean energy.

SUMMARY OF THE INVENTION

In light of the above background, in order to fulfill the industrial requirements, the invention provides a continuous hydrogen production device and method thereof. According to the invention, unmodified aluminum and general tap water are used to continuously produce hydrogen and the generated aluminum oxide ($Al_2O_3$) and aluminum hydroxide ($Al(OH)_{3(s)}$) precipitates can be recycled through a conventional method.

One object of the present invention is to provide a continuous hydrogen production device and method thereof by using a saturated aluminum hydroxide solution, preferably a saturated aluminum hydroxide suspension solution including aluminum hydroxide nanoparticles, as the initiation solution to instantly and continuously produce hydrogen without adding other metals or metal ions. Thus, the method of aluminum recovery is simple and has low cost so as to lower the hydrogen production cost.

Furthermore, one object of the present invention is to provide a continuous hydrogen production device to instantly provide hydroxide by incorporating with a hydrogen storage device to shorten the initial time of hydrogen production from chemical reaction of the hydrogen production device. After the initial time of hydrogen production (producing hydrogen for the first time after starting up the device), the continuous hydrogen production device according to the invention will continuously produce hydrogen by periodically adding aluminum and water or by temperature control through a temperature controller.

In order to achieve the above purposes, one embodiment of the present invention discloses a continuous hydrogen production device. The hydrogen production device comprises a reaction chamber, a solid raw material inlet, a liquid raw material inlet, a gas outlet, and a temperature controller. The reaction chamber contains an initiation solution and the initiation solution comprises a saturated aluminum hydroxide solution. The solid raw material inlet is provided on the reaction chamber and aluminum powders are added into the reaction chamber from the solid raw material inlet as a solid raw material to react with the initiation solution to produce hydrogen gas. The liquid raw material inlet is provided on the reaction chamber and water is added into the reaction chamber from the liquid raw material inlet as a liquid raw material. The gas outlet is provided at a top portion of the reaction chamber and the produced hydrogen gas is collected through the gas outlet. The temperature controller comprises at least one temperature sensor and controls the temperature of the reaction chamber within a preset reaction temperature range. When aluminum powders are added into the reaction chamber for the first time, the aluminum powders react with the initiation solution to produce hydrogen gas and the temperature of the reaction chamber gradually increases at the same time. When the temperature of the reaction chamber reaches a preset temperature, the temperature controller controls the temperature of the reaction chamber within the preset reaction temperature range by opening the liquid raw material inlet to add a preset amount of water, when the temperature of the reaction chamber is higher than a preset upper limit temperature, or opening the solid raw material inlet to add aluminum powders, when the temperature of the reaction chamber is lower than a preset lower limit temperature, so as to continuously produce hydrogen gas.

In one embodiment, the continuous hydrogen production device further comprises a solid recovery device provided at a bottom portion of the reaction chamber to collect precipitates.

In one embodiment, the preset reaction temperature range is between 50° C.~100° C.; the preset upper limit temperature is 100° C.; and the preset lower limit temperature is 90° C.

In one embodiment, the preset temperature is between 50° C. and 100° C.

In one embodiment, the continuous hydrogen production device further comprises a hydrogen storage device connected with the gas outlet to store the produced hydrogen gas so as to instantly supply hydrogen gas with no delay time.

In one embodiment, the ratio of the aluminum powders to water in the initiation solution by weight is from 1/5 to 1/15.

In one embodiment, the method for preparing the initiation solution comprises: providing a preset amount of aluminum powders (for example, 3 g); providing water (for example, 15 g) to have the ratio of water to the aluminum powders by weight be 5~15; having reaction between water and aluminum powders to form a reaction solution; and using the upper suspension solution of the reaction solution, after reaction, as the initiation solution. The "upper suspension solution" means the upper layer of the reaction solution.

In one embodiment, the initiation solution further preferably comprises aluminum hydroxide nanoparticles with an average particle diameter less than 500 nm. Moreover, the initiation solution is preferably a saturated aluminum hydroxide suspension solution comprising aluminum hydroxide-nanoparticles.

Furthermore, another embodiment of the present invention discloses a method for continuously producing hydrogen gas, comprising: providing a reaction chamber; adding an initiation solution into the reaction chamber where the initiation solution is a saturated aluminum hydroxide solution; adding aluminum powders (for example, 3 g) into the reaction chamber; blending the initiation solution and the aluminum powders to perform a chemical reaction to produce hydrogen gas; and, when the temperature of the reaction chamber reaches a preset temperature (for example, 50~90° C. where the temperature depends on user's design and also is related to the amount of water in use), maintaining the temperature of the reaction chamber within the preset reaction temperature range (for example, 50~100° C.) by adding a preset amount of water, when the temperature of the reaction chamber is higher than a preset upper limit temperature (for example, 100° C.), or adding aluminum powders, when the temperature of the reaction chamber is lower than a preset lower limit temperature(for example, 90° C.), so as to continuously produce hydrogen gas. The above mentioned preset reaction temperatures, such as the preset temperature, the preset reaction temperature range, the preset upper limit temperature, or the preset lower limit temperature, are set accordingly based on the design of hydrogen production. The more water is used, the lower the temperature is. For example, 15 g~45 g of water may be used when 3 g of aluminum powders is used.

In the above method, a solid recovery device can be used to collect precipitates.

In the above method, the preset reaction temperature range is between 50° C.~100° C.; the preset upper limit temperature is 100° C.; and the preset lower limit temperature is 90° C.

In the above method, the preset temperature is between 50° C. and 100° C.

In the above method, a hydrogen storage device can be used to be connected with the gas outlet to store the produced hydrogen gas so as to instantly supply hydrogen gas with no delay time.

In the above method, the ratio of the aluminum powders to water in the initiation solution by weight is from 1/5 to 1/15.

In the above method, the method for preparing the initiation solution comprises: providing a preset amount of aluminum powders (for example, 3 g); providing water (for example, 15 g) to have the ratio of water to the aluminum powders by weight be 5~15; having reaction between water and aluminum powders to form a reaction solution; and using the upper suspension solution of the reaction solution, after reaction, as the initiation solution. The initiation solution further preferably comprises aluminum hydroxide nanoparticles with an average particle diameter less than 500 nm. Moreover, the initiation solution is preferably a saturated aluminum hydroxide suspension solution comprising aluminum hydroxide nanoparticles.

According to the continuous hydrogen production device and the method for continuously producing hydrogen gas of the present invention, unmodified aluminum and general tap water are used to continuously produce hydrogen and the generated aluminum oxide ($Al_2O_3$) and aluminum hydroxide ($Al(OH)_{3(s)}$) precipitates can be recycled to regenerate aluminum. Therefore, the purposes of continuously massively producing hydrogen with low cost can be achieved.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Accordingly, the drawings and descriptions will be regarded as illustrative in nature and not as restrictive.

Figure 1:
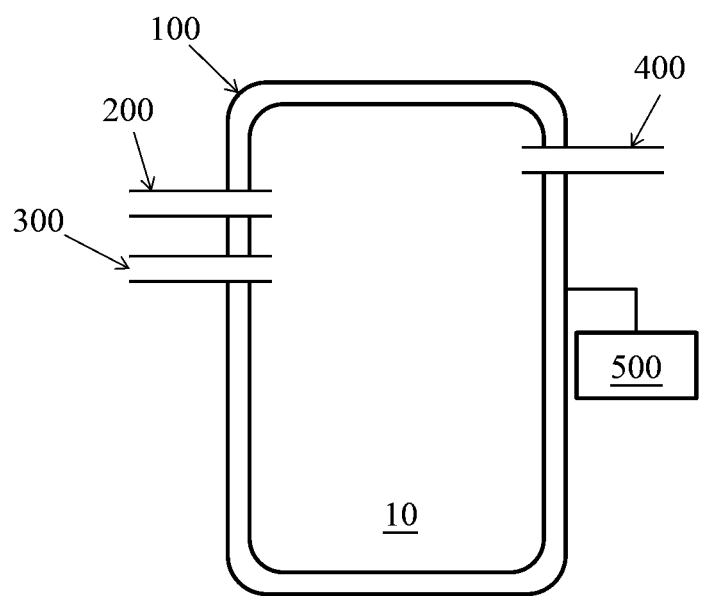
FIG. 1 shows a schematic diagram illustrating a continuous hydrogen production device according to one embodiment of the present invention.

One embodiment of the invention provides a continuous hydrogen production device. FIG. 1 shows a schematic diagram illustrating a continuous hydrogen production device according to one embodiment of the present invention. The continuous hydrogen production device 10 comprises a reaction chamber 100, a solid raw material inlet 200, a liquid raw material inlet 300, a gas outlet 400, and a temperature controller 500.

The reaction chamber 100 contains an initiation solution. The initiation solution comprises a saturated aluminum hydroxide solution. The initiation solution further preferably comprises aluminum hydroxide nanoparticles with an average particle diameter less than 500 nm. Moreover, the initiation solution is preferably a saturated aluminum hydroxide suspension solution comprising aluminum hydroxide nanoparticles. The so-called "saturated aluminum hydroxide suspension solution" means that aluminum hydroxide dissolves in an aqueous solution to the maximum amount and evenly dispersed aluminum hydroxide particles are included. The wording "nanoparticles" in the invention denotes a particle with an average diameter less than 1 μm, preferably less than 500 nm, more preferably less than 100 nm, and even more preferably less than 50 nm.

The solid raw material inlet 200 is provided on the reaction chamber 100 and aluminum powders are added into the reaction chamber from the solid raw material inlet 200 as a solid raw material to react with the initiation solution to produce hydrogen gas. The liquid raw material inlet 300 is provided on the reaction chamber 100 and water is added into the reaction chamber from the liquid raw material inlet 300 as a liquid raw material. The gas outlet 400 is provided at a top portion of the reaction chamber 100 and the produced hydrogen gas is collected through the gas outlet 400. The temperature controller 500 comprises at least one temperature sensor, such as thermocouples, and controls the temperature of the reaction chamber within a preset reaction temperature range, such as 50° C.~100° C. The reaction temperature range can be adjusted according to the design of the reaction chamber, such as volume, shape, etc.

For example, in the hydrogen production device 10, for the first time meaning just starting up the device 10, aluminum powders are added into the reaction chamber 100 from the solid raw material inlet 200 and then the aluminum powders react with the initiation solution to produce hydrogen gas and the temperature of the reaction chamber 100 gradually increases at the same time. When the temperature of the reaction chamber 100 reaches 90° C. (lower than the boiling point of water (100° C.)) by measuring the temperature of water, the temperature controller 500 controls the temperature of the reaction chamber 100 within 50° C.~100° C. For example, when the temperature of the reaction chamber is higher than 90° C., the liquid raw material inlet 300 is open to add a preset amount of water (small amount, such as 5 ml). When the temperature of the reaction chamber is lower than 90° C., the solid raw material inlet 200 is open to add aluminum powders. Thus, the reaction chamber 100 can continuously produce hydrogen gas by adding aluminum and water periodically or based on the temperature detected by the temperature controller 500. The reaction temperature range (50° C.~100° C.) can be adjusted according to the design of the reaction chamber, such as volume and shape, or according to the degree of desired reaction. For example, 3 g of aluminum powders and 15 g of water react at 70° C. for 15 minutes to produce 2860 ml of hydrogen gas. The reaction conditions of the hydrogen production device 10 are not limited to the above example and can be adjusted, for example, according to the volume and shape of the reaction chamber, the upper limit reaction temperature, the lower limit reaction temperature, etc.

The continuous hydrogen production device according to the invention can further comprise a solid recovery device provided at a bottom portion of the reaction chamber to collect precipitates. The reaction precipitates are usually aggregated aluminum hydroxides. The solid recovery device can be implemented by a conventional device, such a manifold to separate the aggregated aluminum hydroxides and return liquids back to the reaction chamber. In another embodiment, solid recovery device can be implemented by a filtration net to collect large particles but keep the suspension. Furthermore, the continuous hydrogen production device according to the invention can further comprise a hydrogen storage device to store the produced hydrogen gas and function as a hydrogen supplier for the first few minutes after the hydrogen production device starts. Thus, the continuous hydrogen production device according to the invention can instantly supply hydrogen gas in practical use.

According to the experimental data from the inventors, the ratio of the aluminum powders to water in the initiation solution by weight is preferably from 1/5 to 1/15.

Figure 2:
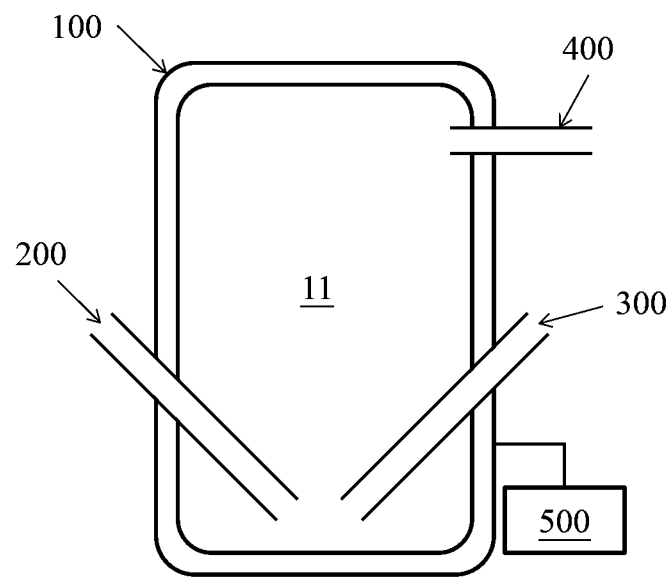
FIG. 2 shows a schematic diagram illustrating a continuous hydrogen production device according to another embodiment of the present invention.

FIG. 2 shows a schematic diagram illustrating a continuous hydrogen production device according to another embodiment of the present invention. Compared to the continuous hydrogen production device 10, the continuous hydrogen production device 11 comprises the solid raw material inlet 200 and the liquid raw material inlet 300 located at different positions from the continuous hydrogen production device 10 and the rests are the same as those of the continuous hydrogen production device 10. The continuous hydrogen production device of the invention is not limited to the above configuration shown in FIG. 1 or 2 as long as solids and liquids can be blended thoroughly. Certainly, in order to blend solids and liquids, a blender or mixer can be provided according to the size of the reaction chamber.

Furthermore, another embodiment of the invention provides a method for continuously produce hydrogen gas. The method comprises the following steps: providing a reaction chamber; adding an initiation solution into the reaction chamber where the initiation solution is a saturated aluminum hydroxide solution; adding aluminum powders (for example, 3 g) into the reaction chamber; mixing the initiation solution and the aluminum powders to perform a chemical reaction to produce hydrogen gas; and, when the temperature of the reaction chamber reaches a preset temperature (for example, 50~90° C. where the temperature depends on user's design and also is related to the amount of water in use), maintaining the temperature of the reaction chamber within the preset reaction temperature range (for example, 50~100° C.) by adding a preset amount of water, when the temperature of the reaction chamber is higher than a preset upper limit temperature (for example, 100° C.), or adding aluminum powders, when the temperature of the reaction chamber is lower than a preset lower limit temperature (for example, 90° C.), so as to continuously produce hydrogen gas. The above mentioned preset reaction temperatures, such as the preset temperature, the preset reaction temperature range, the preset upper limit temperature, or the preset lower limit temperature, are set accordingly based on the design of hydrogen production, such as according to the degree of desired reaction or the volume or shape of the reaction chamber. The preset reaction temperature range is between 50° C.~100° C. The preset upper limit temperature is preferably 50~100° C. The preset lower limit temperature is 50~90° C.

The method for preparing the initiation solution comprises: providing a preset amount of aluminum powders (for example, 3 g); providing water to have the ratio of water to the aluminum powders by weight be 5~15; having reaction between water and aluminum powders to form a reaction solution; and using the upper suspension solution of the reaction solution, after reaction, as the initiation solution. For example, 3 g of aluminum powders and 15 g of water react at 70° C. for 15 minutes and the upper suspension solution of the reaction solution is used as the saturated aluminum hydroxide suspension solution comprising aluminum hydroxide nanoparticles. The so-called "saturated aluminum hydroxide suspension solution" means that aluminum hydroxide dissolves in an aqueous solution to the maximum amount and evenly dispersed aluminum hydroxide particles are included.

In conclusion, the continuous hydrogen production device and the method for continuously producing hydrogen gas of the present invention use unmodified aluminum and general tap water to instantly and continuously produce hydrogen without adding other metals or metal ions and the generated aluminum oxide ($Al_2O_3$) and aluminum hydroxide ($Al(OH)_{3(s)}$) precipitates can be recycled to regenerate aluminum. Therefore, the purposes of continuously massively producing hydrogen with low cost can be achieved.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for continuously producing hydrogen gas, comprising:

providing a reaction chamber;

adding an initiation solution into the reaction chamber where the initiation solution is a saturated aluminum hydroxide solution;

adding aluminum powders into the reaction chamber;

blending the initiation solution and the aluminum powders to perform a chemical reaction to produce hydrogen gas; and when the temperature of the reaction chamber reaches a preset temperature, maintaining the temperature of the reaction chamber within 50° C.~100° C. by adding a preset amount of water, when the temperature of the reaction chamber is higher than 100° C., or adding aluminum powders, when the temperature of the reaction chamber is lower than 90° C., so as to continuously produce hydrogen gas without adding other metals or metal ions; and further wherein the method for preparing the initiation solution comprises:

providing a preset amount of aluminum powders;

providing water to have the ratio of water to the aluminum powders by weight be 5~15;

having reaction between the water and aluminum powders to form a reaction solution; and using the upper layer of the reaction solution, after reaction, as the initiation solution.

2. The method according to claim 1, wherein the initiation solution further comprises aluminum hydroxide nanoparticles with an average particle diameter less than 500 nm.

3. The method according to claim 1, wherein the initiation solution is a saturated aluminum hydroxide suspension solution comprising aluminum hydroxide nanoparticles.

4. The method according to claim 1, further comprising: collecting precipitates by a solid recovery device.

5. The method according to claim 1, further comprising: using a hydrogen storage device to store the produced hydrogen gas.

* * * * *